(No Model.)
C. E. BOSTWICK.
TROLLEY WHEEL.
No. 522,550.  Patented July 3, 1894.
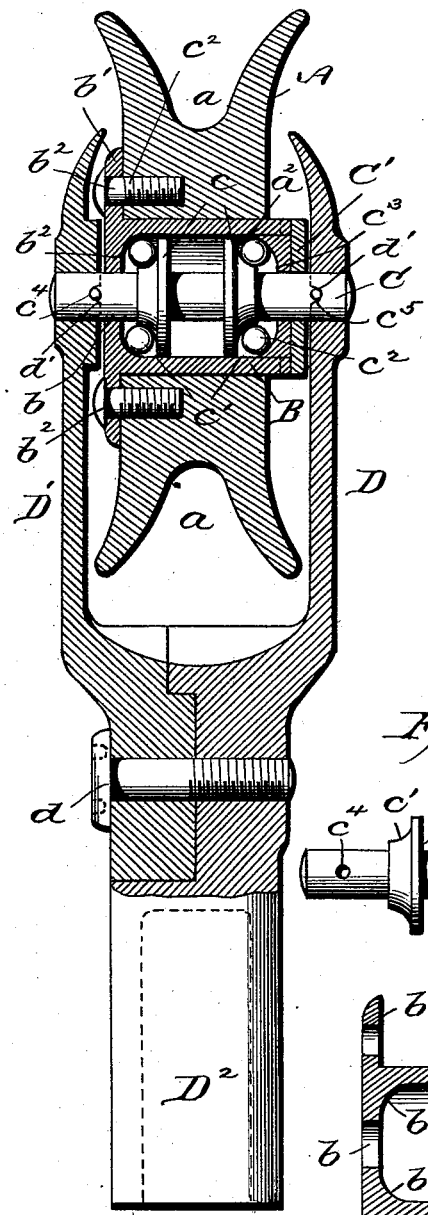
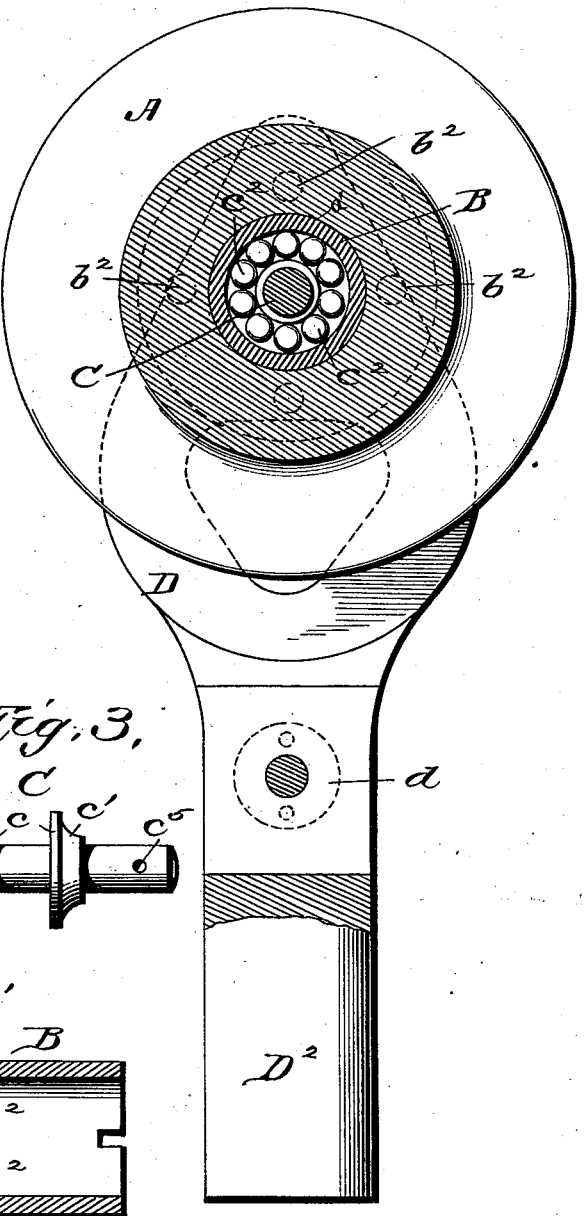
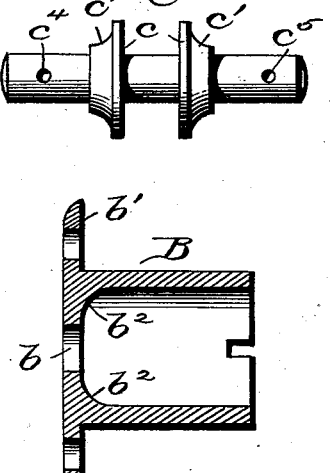
Witnesses
Inventor
Charles E. Bostwick.
By R.S. & A.P. Lacey
Attorneys
THE NORRIS PETERS CO., PHOTO-LITHO., WASHINGTON, D. C.

UNITED STATES PATENT OFFICE.

CHARLES E. BOSTWICK, OF DU BOIS, PENNSYLVANIA, ASSIGNOR OF ONE-HALF TO G. E. GRIER, JAMES W. GRIER, AND JOHN C. GRIER, OF SAME PLACE.

TROLLEY-WHEEL.

SPECIFICATION forming part of Letters Patent No. 522,550, dated July 3, 1894.

Application filed March 15, 1894. Serial No. 503,714. (No model.)

*To all whom it may concern:*

Be it known that I, CHARLES E. BOSTWICK, a citizen of the United States, residing at Du Bois, in the county of Clearfield, State of Pennsylvania, have invented certain new and useful Improvements in Trolley-Wheels; and I do hereby declare the following to be a full, clear, and exact description of the invention, such as will enable others skilled in the art to which it appertains to make and use the same.

This invention relates to an improved trolley wheel for electric railways.

The invention relates most particularly to the bearing of the wheel and the manner of connecting said wheel with the bearing, the object of the invention being to provide a trolley in which the parts shall move with very little friction, one in which the wheel proper can be removed at any time without disturbing the bearing, and one in which all auxiliary contact springs are dispensed with.

My invention consists in certain details of construction and combination of parts all of which will be fully described hereinafter and pointed out in the claim.

In the drawings forming a part of this specification, Figure 1 is a transverse sectional view of my improved trolley. Fig. 2 is a longitudinal sectional view. Fig. 3 is a detail view of the journal. Fig. 4 is a detail view of the casing.

In carrying out my invention I employ a trolley wheel A of brass or other suitable conducting material, said wheel having a peripheral groove $a$ to receive the conductor wire, and a central opening $a'$ to receive the central bearing. This central bearing consists of a casing B which fits in the opening $a$ and a journal C which passes through the casing and has its ends secured in the forks D and D' attached to the pole $D^2$, the fork D being preferably formed integral with the pole $D^2$ while the fork D' is made detachable and is secured to the pole by means of a bolt $d$.

The casing B is cylindrical in shape and is closed at one end with the exception of an aperture $b$ to permit the passage of the journal C. At said closed end the casing is also formed with a lateral annular flange $b'$ said flange being perforated to receive the screws $b^2$ by means of which the trolley wheel is secured to the casing. The journal C is formed with two flanges or collars C C the anti-faces of which are concaved as shown at $c'$. The inner face of the end of casing is also concaved, as shown at $b^2$, thus forming an oval annular chamber between said faces in which is arranged a series of anti-friction balls $C^2$. The opposite end of the casing is closed by means of a cap C', the inner face of which is concaved as shown at $c^3$ so that a similar chamber is formed to receive a second set of balls $c^2$. The journal is secured against lateral movement by means of pins $c^4 c^5$, which pass through the ends of the same without the ends of the casing, said pins resting in grooves $d'$ formed in the inner faces of the prongs D and D'.

In operation the journal and ball bearings are inserted in the casing which is first filled with oil and then closed securely by means of the cap. The pins are then passed through the journal and the case is inserted into the central opening of the wheel. The wheel is then secured to the flange of the casing and the ends of the journal arranged in the forks of the trolley. The device is now complete and ready for use, the current being conducted from the wire to the wheel, then to the case, and finally to the axle and forks, where it goes to the pole and is then led to the car in the usual manner.

Should the wheel proper become worn or broken it can be easily removed by simply removing the screws and drawing the casing out of the wheel, and substituting a new wheel.

It will also be seen that I provide a large oil chamber and also that I dispense entirely with auxiliary springs and kindred appliances.

Having thus described my invention, what I claim, and desire to secure by Letters Patent, is—

In a trolley, the combination with a fork of the journal rigidly mounted in said fork, said journal having collars formed thereon intermediate its ends, the outer faces of which are concaved, a wheel having a central opening, and a cylindrical casing located in said opening and through which the journal passes, said casing being integrally closed at one end and provided with an integral annular flange at said end, a cap for closing the opposite end, the said ends being concaved upon their interior faces, anti-friction balls held between said ends and the collars formed on the journal, and the bolts for securing the casing in the wheel, substantially as shown and described.

In testimony whereof I affix my signature in presence of two witnesses.

CHAS. E. BOSTWICK.

Witnesses:
G. W. LENKERD,
W. C. PENTZ.